Oct. 6, 1936.  D. APPIANI  2,056,882

RODENT TRAP

Filed March 21, 1936   2 Sheets-Sheet 1

Inventor

Daniel Appiani

By Clarence A. O'Brien and
Hyman Berman
Attorneys

Oct. 6, 1936.  D. APPIANI  2,056,882
RODENT TRAP
Filed March 21, 1936  2 Sheets-Sheet 2

Inventor
Daniel Appiani
By Clarence A O'Brien and
Hyman Berman
Attorneys

Patented Oct. 6, 1936

2,056,882

UNITED STATES PATENT OFFICE 2,056,882

RODENT TRAP

Daniel Appiani, New York, N. Y.

Application March 21, 1936, Serial No. 70,160

5 Claims. (Cl. 43—73)

This invention appertains to new and useful improvements in the general art of trapping and more particularly to a novel rodent trap.

The principal object of the present invention is to provide a trap of the automatic type wherein the rodent in an effort to reach the bait, sets off a trigger, which releases his support with the result that he is precipitated into a compartment of water.

Another important object of the invention is to provide a trap of the character stated which in operation will be positive acting and not susceptible to the development of frequent defects.

These and various other important objects and advantages of the invention will become apparent to the reader of the following specification.

Figure 2:
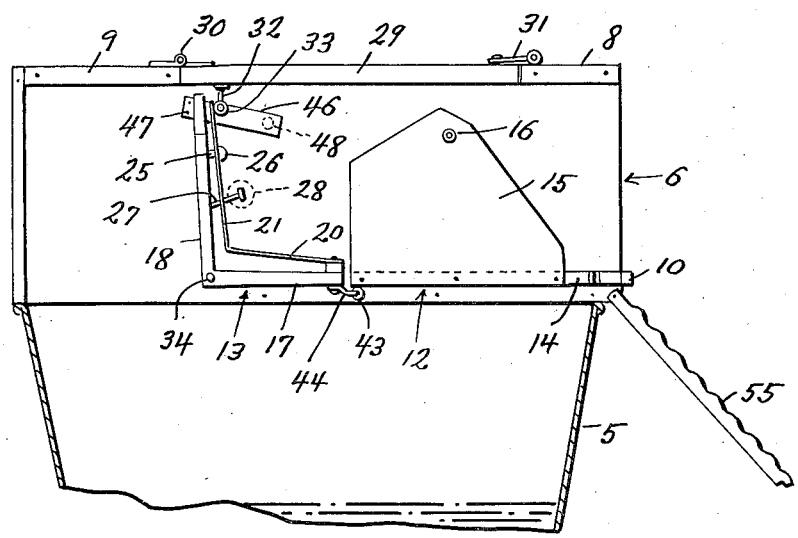
Figure 2 represents a fragmentary side elevational view of the trap with one side wall removed and partly showing the pail in section.
Figure 4:
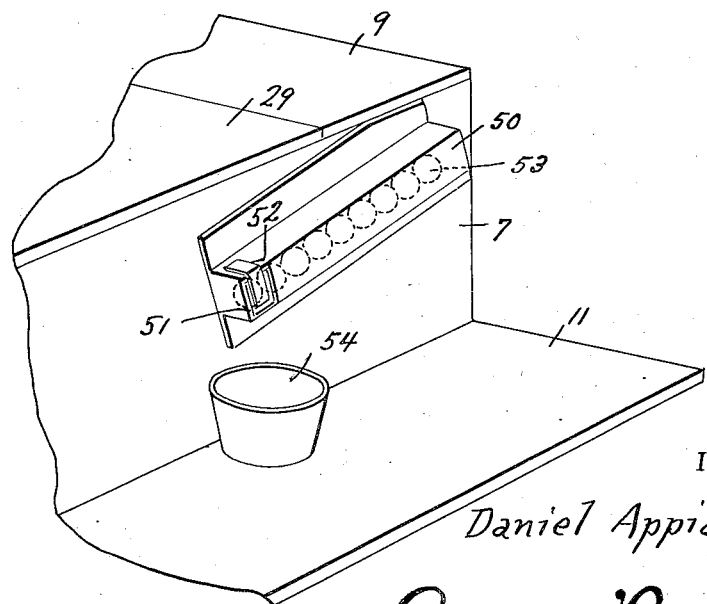
Figure 4 is a fragmentary perspective view of the opposite side of the trap from that shown in Figure 1.

Referring to the drawings wherein like numerals designate like parts, it can be seen that numeral 5 represents a pail of conventional structure and this pail is to be filled to approximately the level shown in Figure 2 with water or some other desired liquid.

The trap proper consists of a box-like structure generally referred to by numeral 6 of elongated construction, the same including the side walls 7—7 connected by the front and rear pieces 8—9 at their upper longitudinal edges. The forward end of the side walls 7—7 are connected by the strip 10, while extending laterally from the lower edges of the side walls 7—7 are the ledges 11—11 which serve to completely close off the top of the pail 5.

Figure 1:
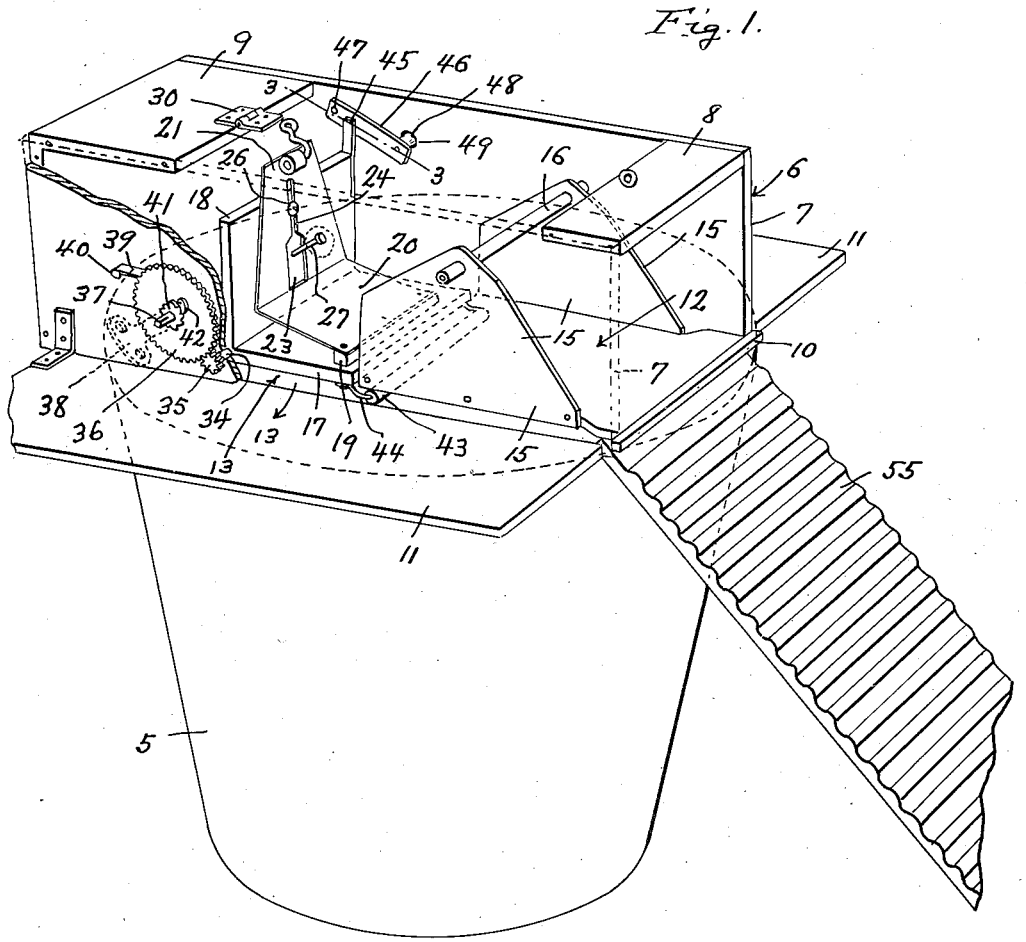
Figure 1 represents a perspective view of the trap superimposed on a pail of water with parts broken away to disclose the internal mechanism thereof.
Figure 3:
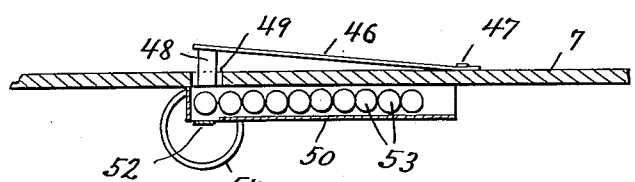
Figure 3 is a fragmentary enlarged detail in sectional view taken substantially on line 3—3 of Figure 1.

As shown in Figures 1 and 2, inside of the box-like structure 6 is the rockable platform generally referred to by numeral 12 and the rotor generally referred to by numeral 13. The rockable platform 12 consists of the floor 14 provided with the upstanding side walls 15—15. These side walls 15—15 have a shaft 16 extending through the upper portions thereof and through the side walls 7—7. Thus the platform 12 is rockably supported and is in conjunction with the rotor 13. This rotor 13 consists of the floor 17 and the back wall 18 extending from the rear edge of the floor 17.

Upon the floor 17 is the cleat 19 and secured to this is the forward edge of the plate 20 which has an upwardly extending tongue 21 at its rear edge. In this tongue 21 is the vertically extending slot 23 merging with the narrow slot 24. A retaining element 25 extends forwardly from the back wall 18 and through the slot 24, the same being provided with a head 26 which prevents displacement of the tongue 21 from the retaining element 25.

A nail or other similar bait holding element 27 is disposed through the large slot 23 and is driven into the back wall 18 for supporting a piece of bait 28 in front of the tongue 21. This tongue 21 is of fine gauge sheet metal and is suitably flexible so that when a rodent steps upon the plate 20, the tongue 21 will move downwardly under the weight of the creature.

Now referring to Figure 2, it can be seen that numeral 29 is a closure for the space between the cross pieces 8 and 9. This closure 29 is hingedly connected as at 30 to the rear cross piece 9 and a suitable fastener 31 is provided between the free end of the closure 29 and the cross piece 8. An arm 32 depends from the hinged end portion of the closure 29 and carries a roller 33 against which the upper end of the tongue 21 abuts as shown in Figure 2. This roller 33 serves to prevent rotation of the rotor 13 when there is no weight imposed on the plate 20. It can be seen at this point, that the point at which the floor 17 and the back wall 18 merge, pins 34 are provided and these are journalled through the side walls 7—7.

On one of these pintles 34 is a pinion 35 with which the gear 36 meshes. This gear 36 is on the shaft 37 the outer end of which is squared to accommodate a winding key 38. A strip spring 39 is anchored to one side wall 7 as at 40 and is wound around the shaft 37 and attached thereto. A ratchet wheel 41 on the shaft 37 is engaged by the dog 42 on the gear 36 so that the shaft 37 is held against slipping under the tension of the spring 39.

It will be observed in Figures 1 and 2, that a roller 43 has a wire member 44 extending therethrough with its end portions connected to the under side of the rotor 13. This roller 43 engages under the inner end of the platform floor 14 as clearly shown in Figures 1 and 2.

At one end of the back wall 18 of the rotor 13 a finger 45 extends upwardly and is adapted to wipe against the strip spring 46, the rear end of which is anchored as at 47 to the inner side of one side wall 7. The opposite end of the strip spring 46 is provided with a block 48 which is operative through the opening 49 in the adjacent side wall 7. An inclined chute 50 is provided on the outside of the same side wall 7 and has a discharge opening 51 in the lower end thereof over which is a flexible retaining member 52. A row of marbles or small balls 53 is provided in the chute 50 and as the finger 45 rides over the spring 46 as the rotor 13 is released and starts to rotate serves to force the block 48 into the chute 50 and displaces one of the balls, that is the lowermost ball through the outlet 51 and into the container 54. Thus, the number of times the trap has been operated can be determined by the number of balls in the container 54 without lifting the trap from the pail 5.

In the operation of the mechanism, the rodent climbs the incline 55 and walks in onto the platform 14. From there he steps on to the plate 20. As the plate 20 is flexible, it will flex downwardly, lowering the tongue 21. The upper end of the tongue 21 will disengage from the roller 33 and this will permit the rotor 13 to rotate in the direction of the arrows in Figure 1 with the assistance of the spring 39. In this releasement the platform 12 also becomes free to rotate and this leaves nothing for the rodent to catch on to. The rodent drops into the pail and the rotor continues to rotate until the same rotates back to the position shown in Figure 1.

While the foregoing specification sets forth the invention in specific terms, it is to be understood that numerous changes in the shape, size and materials may be resorted to without departing from the spirit or scope of the invention as claimed hereinafter.

Having thus described the invention, what is claimed as new is:

1. A rodent trap comprising an enclosure having an entrance, a tiltable platform in the enclosure, a rotor provided with a floor, a depressible plate on the floor having an upstanding tongue, an abutment on the top of the enclosure against which the tongue normally engages, and spring means associated with the rotor causing the same to rotate when the tongue is disengaged from the abutment.

2. A rodent trap comprising an enclosure having an entrance, a tiltable platform in the enclosure, a rotor provided with a floor, a depressible plate on the floor having an upstanding tongue, an abutment on the top of the enclosure against which the tongue normally engages, spring means associated with the rotor causing the same to rotate when the tongue is disengaged from the abutment, and means whereby the said spring can be wound.

3. A rodent trap comprising an enclosure having an entrance, a tiltable platform in the enclosure, a rotor provided with a floor, a depressible plate on the floor having an upstanding tongue, an abutment on the top of the enclosure against which the tongue normally engages, spring means associated with the rotor causing the same to rotate when the tongue is disengaged from the abutment, and a protuberance on the floor of the rotor upon which one end of the tiltable platform can rest.

4. A rodent trap comprising an enclosure having an entrance, a tiltable platform in the enclosure, a rotor provided with a floor, a depressible plate on the floor having an upstanding tongue, an abutment on the top of the enclosure against which the tongue normally engages, spring means associated with the rotor causing the same to rotate when the tongue is disengaged from the abutment, and a counter operated by the said rotor.

5. A rodent trap comprising an enclosure having an entrance, a tiltable platform in the enclosure, a rotor provided with a floor, a depressible plate on the floor having an upstanding tongue, an abutment on the top of the enclosure against which the tongue normally engages, spring means associated with the rotor causing the same to rotate when the tongue is disengaged from the abutment, a counter operated by the said rotor, said counter consisting of an inclined chute, a plurality of balls in the chute, said chute being provided with a discharge opening at its lower end, and a plunger operative by the said rotor for forcing out the lowermost ball in the chute each time the rotor revolves.

DANIEL APPIANI.